(12) United States Patent
Shih et al.

(10) Patent No.: US 8,927,884 B2
(45) Date of Patent: Jan. 6, 2015

(54) REPLACEABLE KEY MODULE AND KEYBOARD WITH THE SAME

(75) Inventors: Po-Jen Shih, New Taipei (TW); Shu I Chen, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 136 days.

(21) Appl. No.: 13/482,852

(22) Filed: May 29, 2012

(65) Prior Publication Data

US 2013/0062177 A1    Mar. 14, 2013

(30) Foreign Application Priority Data

Sep. 8, 2011   (TW) .............................. 100132498 A (51) Int. Cl.
| | |
|---|---|
| *H01H 9/26* | (2006.01) |
| *H01H 13/72* | (2006.01) |
| *H01H 13/76* | (2006.01) |
| *G06F 3/02* | (2006.01) |
| *H01H 13/86* | (2006.01) |

(52) U.S. Cl.
CPC ............. *G06F 3/0202* (2013.01); *H01H 13/86* (2013.01); *H01H 2215/006* (2013.01); *H01H 2223/03* (2013.01); *H01H 2223/056* (2013.01); *H01H 2233/014* (2013.01); *H01H 2233/034* (2013.01)
USPC ....................................................... 200/5 A

(58) Field of Classification Search
USPC ......... 200/5 A, 402, 405–406, 468, 510–514, 200/520, 521, 314, 329, 333, 341, 345
See application file for complete search history.

(56) References Cited

U.S. PATENT DOCUMENTS

| | | | | |
|---|---|---|---|---|
| 4,479,111 | A * | 10/1984 | Madsen et al. ................... 341/27 |
| 4,515,999 | A * | 5/1985 | Harper ........................... 200/5 A |
| 5,324,902 | A * | 6/1994 | Shen .............................. 200/517 |
| 5,525,979 | A * | 6/1996 | Engle et al. ..................... 341/32 |
| 7,157,651 | B2 * | 1/2007 | Rix et al. ....................... 200/5 A |
| 8,278,579 | B2 * | 10/2012 | Lin et al. ....................... 200/345 |
| 2010/0108486 | A1 * | 5/2010 | Yoshida ........................ 200/520 |

* cited by examiner

*Primary Examiner* — Edwin A. Leon
*Assistant Examiner* — Anthony R. Jimenez
(74) *Attorney, Agent, or Firm* — Chun-Ming Shih (57) ABSTRACT

A replaceable key module for a keyboard, comprising: a keycap holder, a springy member and a keycap. The keycap holder embraces an accommodation space, a first surface having an opening, and a second surface having a hole. The springy member is located on the second surface and within the accommodation space of the keycap holder. The keycap is movably connected to the springy member through the opening of the first surface of the keycap holder and capable of moving between a released position and a depressed position. The keycap is referred to as in a released position when not depressed and in a depressed position pushing the springy member to be deformed downwardly when depressed. By means of adjusting some factors such as hardness, length, material and pressing angle of the springy member, the user may obtain the key module with the specified pressure load as desired.

10 Claims, 8 Drawing Sheets

REPLACEABLE KEY MODULE AND KEYBOARD WITH THE SAME

CROSS-REFERENCE TO RELATED APPLICATIONS

This application claims the benefit of the filing date of Taiwan Patent Application No. 100132498, filed on Sep. 8, 2011, in the Taiwan Intellectual Property Office, the disclosure of which is incorporated herein in its entirety by reference.

BACKGROUND OF THE INVENTION

1. Field of the Invention

This invention is relative to a key module; in particular, relative to a replaceable key module and a keyboard with the same.

2. Description of the Prior Art

So far, the keyboard has still been a common input device of a computer system. Especially for the laptop, the keyboard further becomes a main part of its integral structure. However, the keyboard has a shorter service life compared to the other components of the laptop. For example, when the surface of the keyboard is polluted, the symbols and characters printed thereon could not be easily recognized, or the button of the keyboard will lose its elastic recovery after long term use, or the user splashes the liquid into the keyboard incautiously. These situations speedily reduce the service life of the keyboard.

When a certain operational or electrical problem occurs to the conventional keyboard, the user usually replaces with a brand-new keyboard, which is wasteful and often causes inconvenience to the user.

In addition, in the conventional keyboard, key legends engraved or printed on the keycaps cannot be changed or replaced easily. If the user prefers a given keycap with a different key legend, as an easier way, a thin film that has the desirable key legends printed thereon has to be placed on the keyboard. Or in a more troublesome way, the original key legend printed on the keycap is removed first, and then the desirable key legend is printed on the keycap.

The above-mentioned methods for changing the key legends on the keycaps are not only time consuming but also complicated. Particularly, since the thin film inside the keyboard and the keyboard itself are integrally formed, all the keycaps have the same pressure load. It can not fit the user who has a special requirement or habit.

Further, it is hardly possible for the user to change the color or pressure load for part of the keycaps separately by himself. In the situation that some keys of the keyboard are designed to be definable for the user, it is still difficult to print the key legends corresponding to the defined function on the keycaps on his own.

Therefore, there is need to provide a keyboard that can solve the above problems to improve the convenience of use in keyboards.

SUMMARY OF THE INVENTION

In view of the foregoing, an object of the present invention is to provide a keyboard with a replaceable key module that solves the aforesaid problems of the conventional keyboard.

The present invention discloses the replaceable key module used for a keyboard including a keycap holder, a springy member and a keycap. The keycap holder has an accommodation space in its interior, an opening in a first surface thereof, and a hole in a second surface thereof that is opposite to the first surface. Besides, the springy member is disposed on the second surface in the accommodation space of the keycap holder, and the keycap is moveably disposed on the keycap holder through the opening and connected to the springy member. The keycap is capable of moving between a released position when not pressed and is in the depressed position pushing the springy member to be deformed downwardly when depressed.

The keyboard of the present invention includes a body, a conductive member, a cover and a plurality of replaceable key modules. The body has an inner space in its interior, and the conductive member is disposed within the inner space of the body and provided with a plurality of trigger switches thereon. The cover is disposed onto the body and provided with a plurality of apertures corresponding to the trigger switches of the conductive member. Besides, the replaceable key modules are settled to the keyboard by being inserted into the apertures of the cover, thereby corresponding to the trigger switches of the conductive member respectively at the same time too.

Each of the replaceable key modules includes a keycap holder, a springy member and a keycap. The keycap holder has an accommodation space in its interior, an opening in a first surface thereof, and a hole in a second surface thereof that is opposite to the first surface. Besides, the springy member is disposed on the second surface in the accommodation space of the keycap holder, and the keycap is moveably disposed on the keycap holder through the opening and connected to the springy member. The keycap is capable of moving between a released position when not pressed and is in the depressed position pushing the springy member to be deformed downwardly when depressed.

The effects of the present invention are as follows. In the keyboard with the replaceable key module, the keycap could be replaced individually and easily without throwing away the entire keyboard, and the pressure load of the keycap could vary with the different springy member. So the user can replace a single or some specified keycaps according to his/her requirement or habit.

Further objects, embodiments and advantages of the present invention will be apparent from the detailed description which follows together with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF PREFERRED EMBODIMENTS

Figure 1:
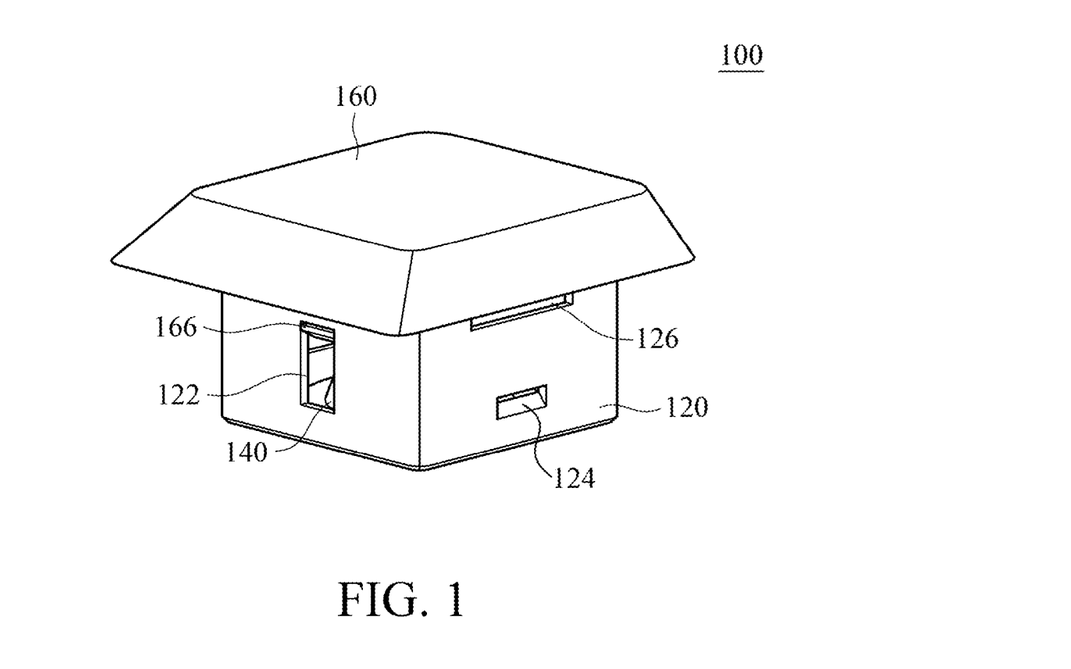
FIG. 1 illustrates a three-dimensional view of a replaceable key module according to an embodiment of the present invention.
Figure 2:
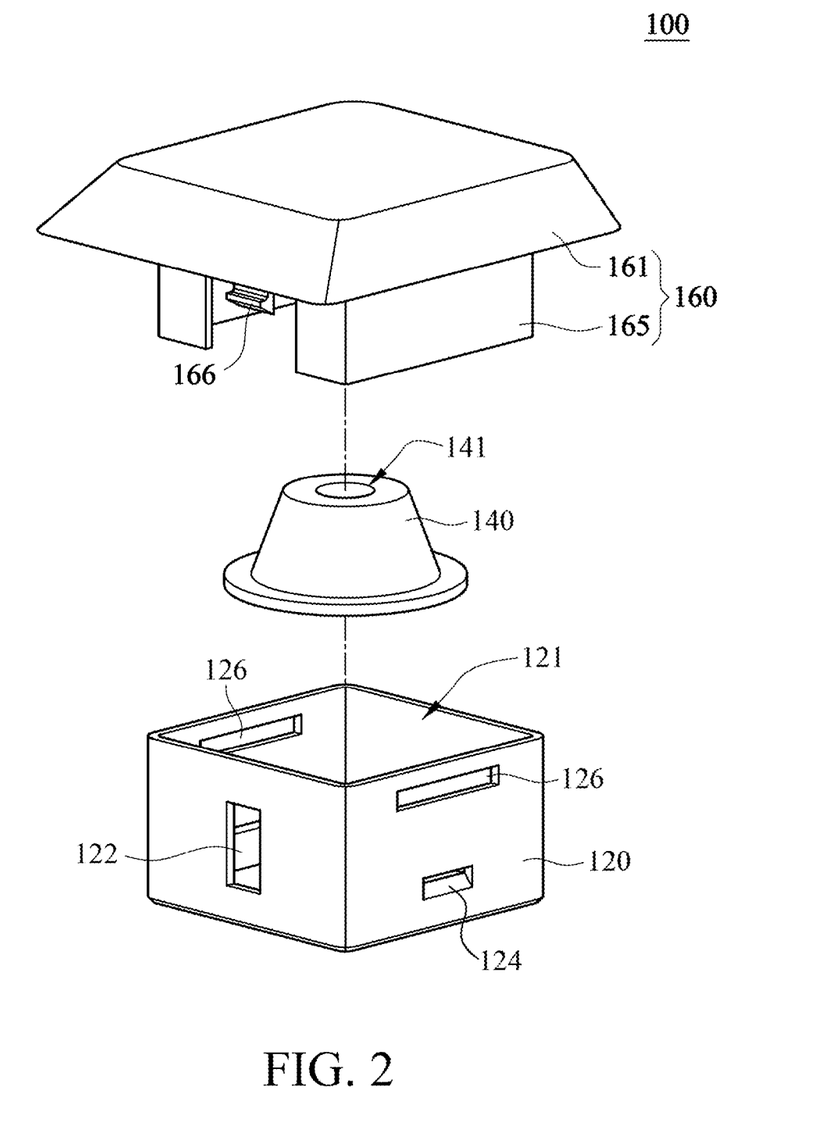
FIG. 2 illustrates an exploded view of the replaceable key module according to an embodiment of the present invention.
Figure 3:
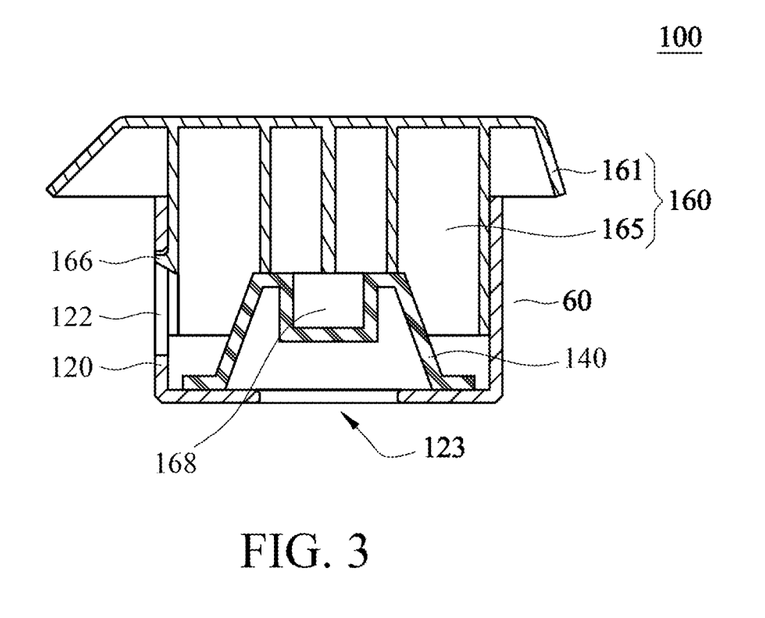
FIG. 3 illustrates a cross-sectional view of the replaceable key module according to an embodiment of the present invention.

FIG. 1 is a three-dimensional view of a replaceable key module 100 according to an embodiment of the present invention, FIG. 2 is an exploded view of the replaceable key module 100 according to the embodiment of the present invention, and FIG. 3 is a cross-sectional view of the replaceable key module 100 according to the embodiment of the present invention.

Figure 4:
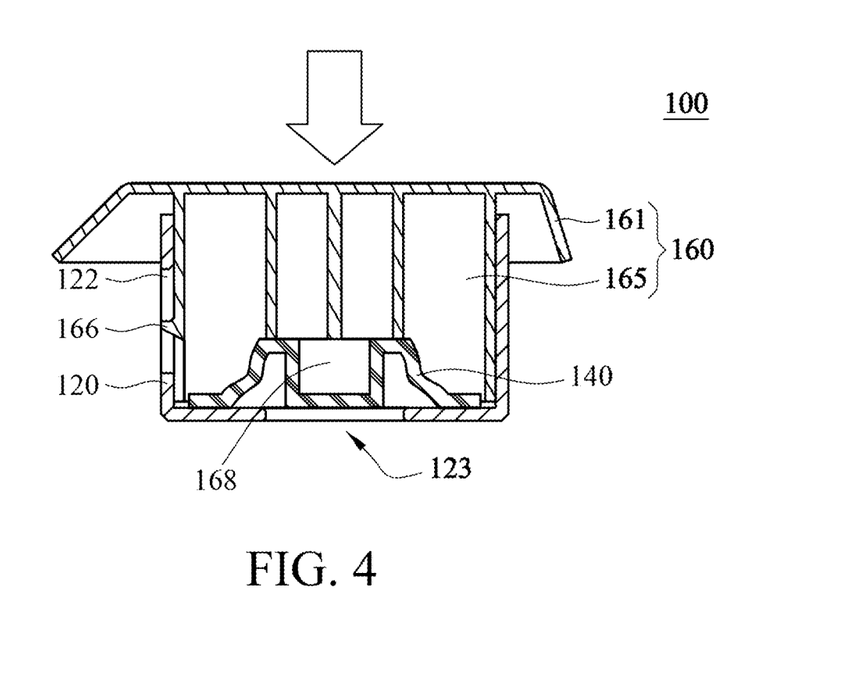
FIG. 4 illustrates a cross-sectional view of the replaceable key module according to an embodiment of the present invention.
Figure 6:
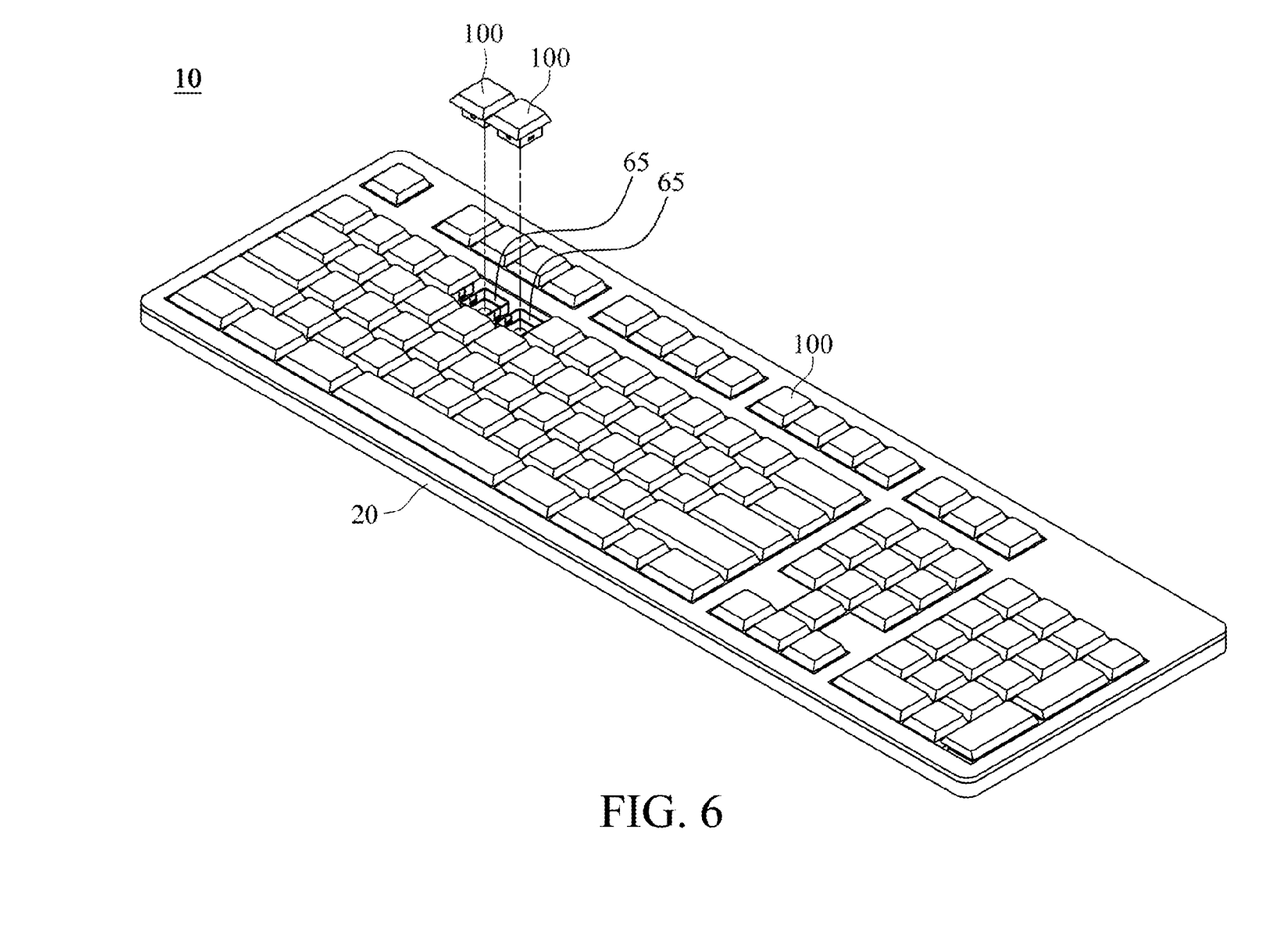
FIG. 6 illustrates a three-dimensional view of the keyboard according to another embodiment of the present invention.

In the embodiment, the replaceable key module 100 is used for a keyboard 10 (as shown in FIG. 6). The replaceable key module 100 includes a keycap holder 120, a springy member 140 and a keycap 160. The keycap holder 120 has an accommodation space in its interior, an opening 121 in a first surface thereof (i.e. a top surface of the keycap holder 120), and a hole 123 in a second surface thereof (i.e. a bottom surface of the keycap holder 120) that is opposite to the first surface. Besides, the springy member 140 is disposed on the second surface in the accommodation space of the keycap holder 120, and the keycap 160 is moveably disposed on the keycap holder 120 through the opening 121 and connected to the springy member 140. Therefore, the keycap 160 could move between a released position where the springy member 140 is maintained in its original state as the keycap 160 is not pressed and a depressed position where the spring member 140 is subject to force as the keycap 160 is pressed, as shown in FIGS. 3 and 4 which illustrate schematically the released and depressed positions of the keycap 160 respectively.

Referring to FIGS. 1-3, the keycap holder 120 has a slot 122 on a sidewall and a hook 166 which is configured to be movably engaged with the slot 122. Thus, the keycap 160 can move back and forth between the released position and the depressed position. Besides, as shown in FIG. 4, by means of the cooperation between the slot 122 and the hook 166, the keycap 160 will not escape from the keycap holder 120.

In the embodiment, the keycap 160 is further provided with a support portion 165 passing through the opening 121 to be connected to the springy member 140 and a pressing portion 161 connected to the support portion 165 and located outside the keycap holder 120. However, it will be appreciated the hook 166 and the slot 122 can be respectively arranged to other sidewall or surface of the keycap holder 120 provided that the cooperation between the both functions as above. In other words, the arrangement of the slot 122 and the hook 166 in the embodiment is illustrative rather than limitative, and a person skilled in the art may modify the design or shape thereof or relative position there between as required.

Referring back to FIGS. 2-4, the springy member 140 may alternatively have a recess 141, and the keycap 160 may have a pillar 168. The pillar 168 is provided to the support portion 165 to be inserted into the recess 141 of the springy member 140. It is to be noted that the springy member 140 is made of rubber in the embodiment, but it is only for illustration rather than limitation. It is noted that the pressure load of the keycap 160 could be changed by adjusting the determining factors such as hardness, length, pressing angle and material of the springy member 140 of the keycap 160.

Figure 5:
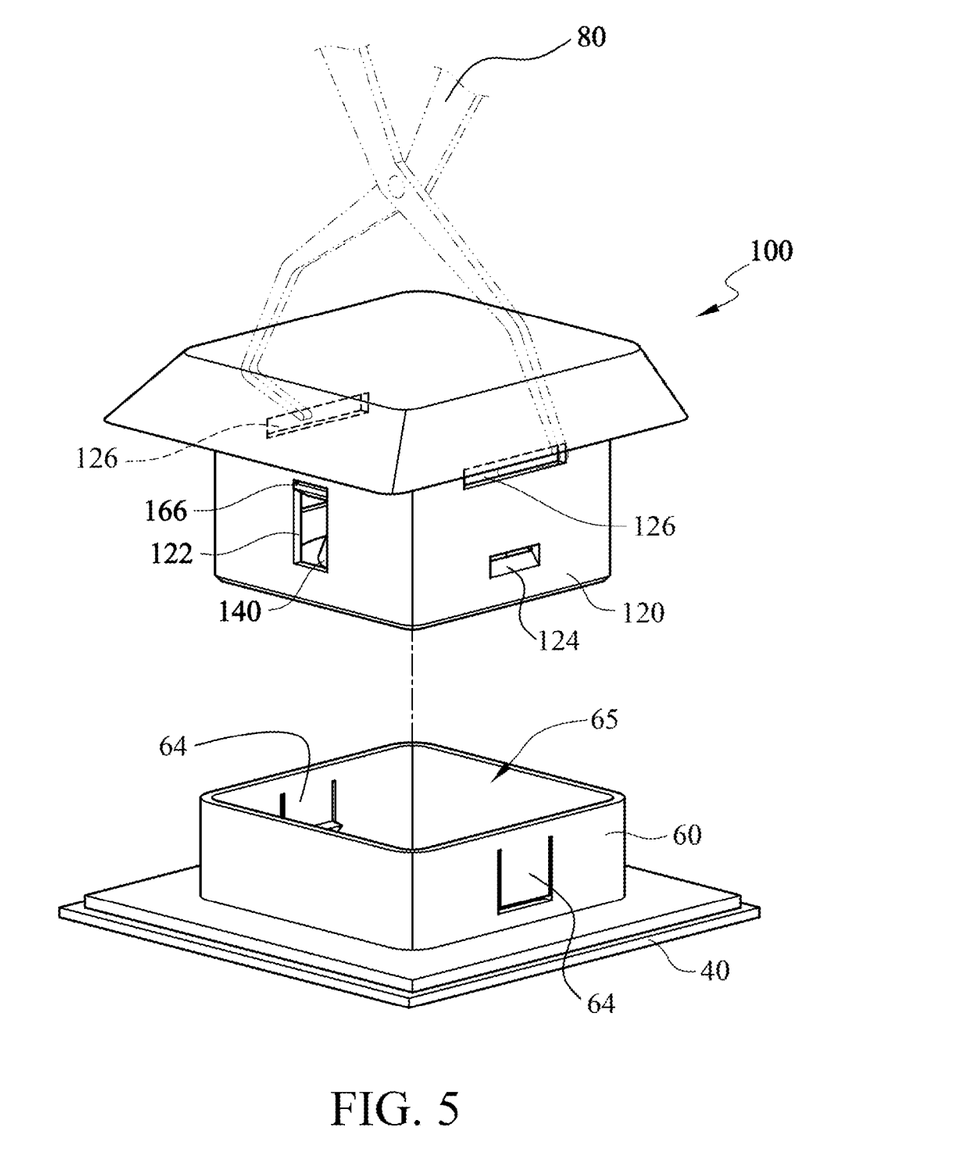
FIG. 5 illustrates a schematic view when the replaceable key module is separate from a keyboard according to another embodiment of the present invention.

FIG. 5 is a schematic view when the replaceable key module 100 is separate from a keyboard 10 according to another embodiment of the present invention. In FIG. 5, the keycap holder 120 may be further provided with a detachment hole 126 on a sidewall to facilitate pulling out the key module 100 from the keyboard 10 using a puller 80. In addition, the keycap holder 120 has at least one trough 124 for at least one buckle member 64 on a cover 60 of the keyboard 10 to be buckled thereinto, so that the keycap holder 120 is fixed to the cover 60 firmly.

Figure 7:
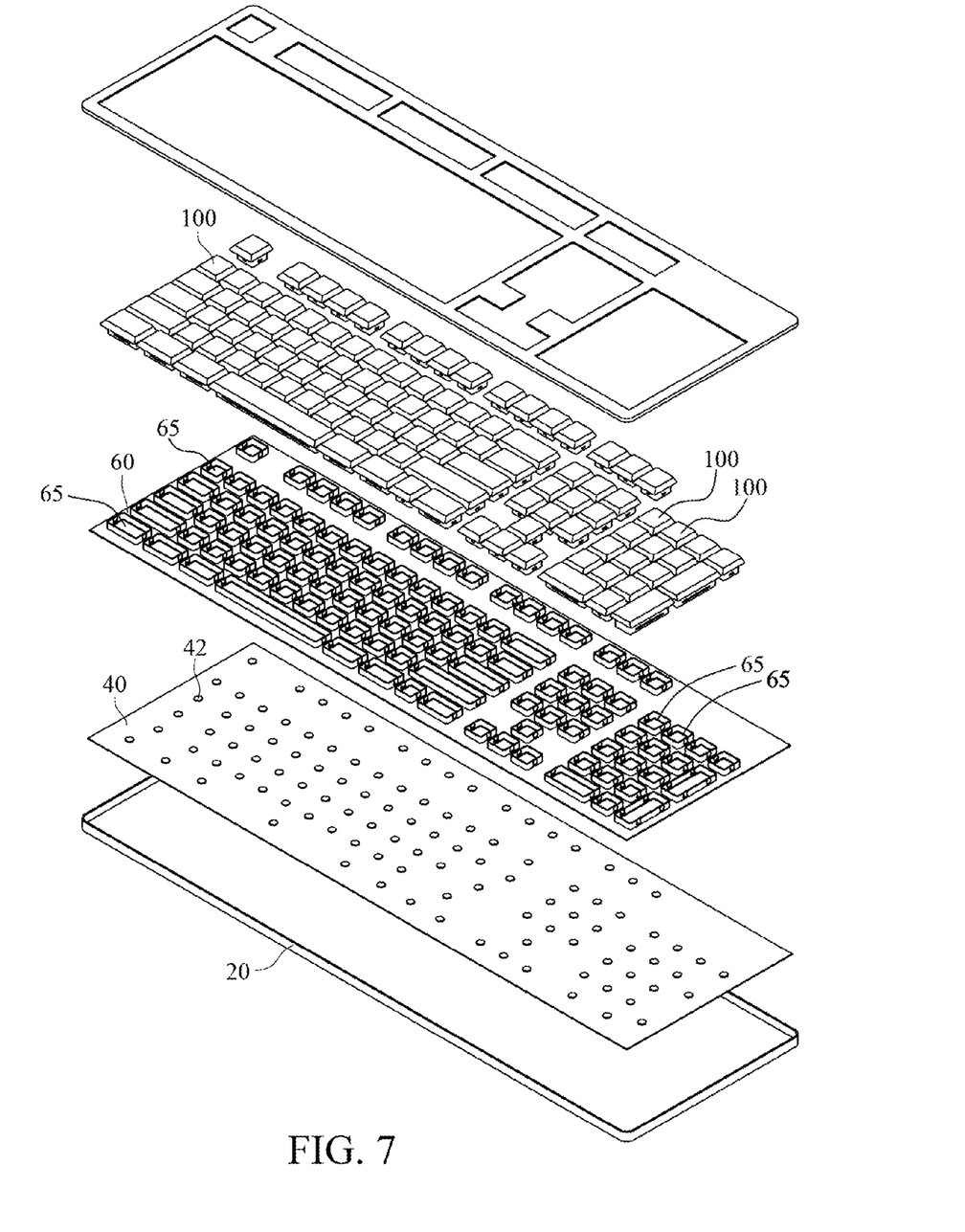
FIG. 7 illustrates an exploded view of the keyboard according to another embodiment of present invention.
Figure 8:
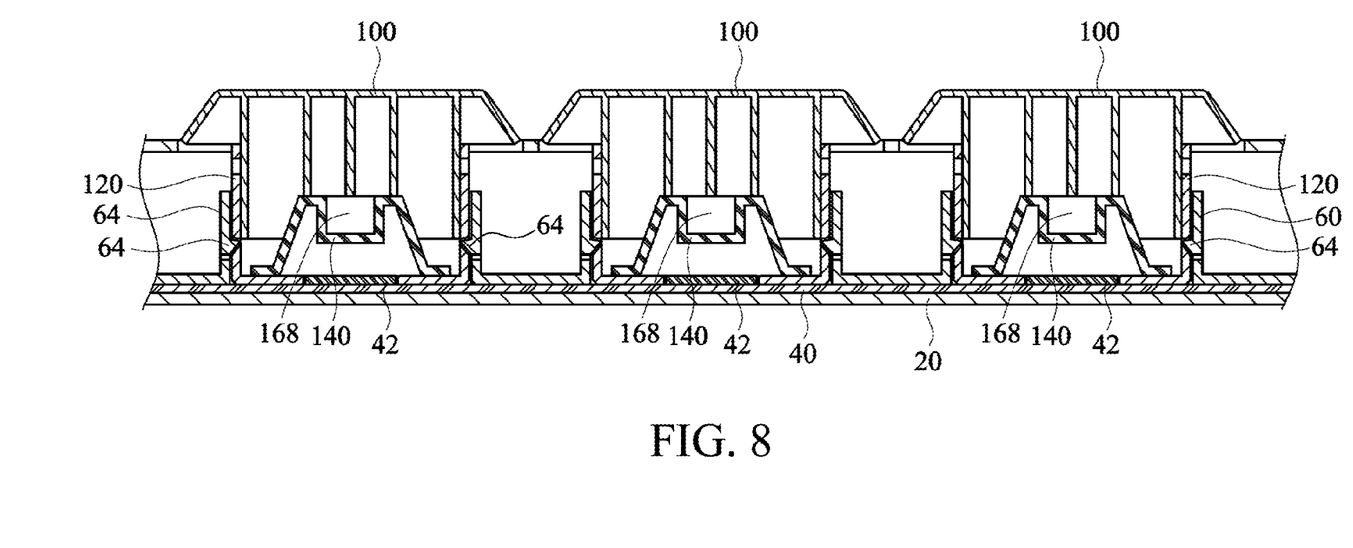
FIG. 8 illustrates a cross-sectional view of the keyboard according to another embodiment of the present invention.

FIGS. 6 and 7 are respectively a three-dimensional view and an exploded view of the keyboard 10 with the replaceable key module 100 according to another embodiment of the present invention. The keyboard 10 of the embodiment includes a body 20, a conductive member 40, a cover 60 and plural replaceable key modules 100, wherein the body 20 has an inner space in its interior, and the conductive member 40 is disposed in the inner space of the body 20 and provided with plural trigger switches 42 thereon. The cover 60 is disposed onto the body 20 and provided with plural apertures 65 corresponding to the trigger switches 42 of the conductive member 40. Besides, the replaceable key modules 100 are settled to the keyboard 10 by being inserted into the apertures 65 of the cover 60, thereby corresponding to the trigger switches 42 of the conductive member 40 respectively at the same time too.

However, the replaceable key modules 100 of this embodiment is basically the same as FIGS. 1-4, so the structure thereof won't be described repetitively here. In addition, as mentioned with respect to FIG. 5, the keycap holder 120 also has at least one trough 124 for at least one buckle member 64 on a cover 60 of the keyboard 10 to be buckled thereinto, so that the keycap holder 120 is fixed to the cover 60 firmly.

The present invention solves the above-mentioned problems of conventional keyboards by providing the key modules that could be replaced or changed individually and independently. The replaceable key module is particularly featured by the keycaps that could be changed easily and rapidly. It is economic and eco-friendly since the user does not have to discard the entire keyboard if only a small number of the keycaps of the keyboard are out of order.

Additionally, it is possible for the user to replace with some key modules having specified or different pressure loads by himself/herself according to the personal requirement or habit for the keyboard of the invention.

While the disclosure has been described in terms of what is presently considered to be the preferred embodiments, it is to be understood that the disclosure shall not be limited to the disclosed embodiment. On the contrary, it is intended to cover various modifications and similar arrangements within the spirit and scope of the appended claims which are to be accorded with the broadest interpretation so as to encompass all such modification and similar structures. It is therefore intended by the appended claims to define the true scope of the invention.

What is claimed is:

1. A replaceable key module used for a keyboard having a cover with at least one aperture and at least one buckle member disposed on an inner wall of the aperture, the replaceable key module comprising:

a keycap holder, for being received in the aperture, and comprising an accommodation space, a first surface having an opening, a second surface opposite to the first surface, and a peripheral surface connecting the first surface and the second surface, the second surface having a through hole, and at least one buckling hole formed on the peripheral surface to be buckled with the corresponding buckle member on the cover of the keyboard;

a springy member, located on the second surface and disposed within the accommodation space; and a keycap, connected movably to the springy member through the opening of the first surface of the keycap holder and capable of moving between a released position and a depressed position, wherein the keycap is in the released position when not depressed and is in the depressed position pushing the springy member to be deformed downwardly when depressed.

2. The replaceable key module according to claim 1, wherein the keycap holder has a slot on a sidewall thereof, and the keycap has a hook which is engaged with the slot so as to be capable of moving between the released position and the depressed position.

3. The replaceable key module according to claim 1, wherein the keycap further comprises a support portion passing through the opening to be connected to the springy member and a pressing portion connected to the support portion and located outside the keycap holder.

4. The replaceable key module according to claim 3, wherein the springy member further has a recess, and the keycap has a pillar disposed onto the support portion and inserted into the recess of the springy member.

5. The replaceable key module according to claim 1, wherein the keycap holder further has a detachment hole provided on a sidewall thereof and is used as a pivot point for pulling out the key module.

6. A keyboard, comprising:
a body, comprising an inner space;
a conductive member, disposed within the inner space of the body and having a plurality of trigger switches;
a cover, disposed onto the body, and having a plurality of apertures thereon and at least one buckle member disposed on an inner wall of one of the apertures, the apertures corresponding to the trigger switches of the conductive member; and
a plurality of replaceable key modules occupying the apertures of the cover and being corresponding to the trigger switches, each of the replaceable key modules comprising:

a keycap holder, for being received in the aperture, and comprising an accommodation space, a first surface having an opening, a second surface opposite to the first surface and having a through hole, a peripheral surface connecting the first surface and the second surface, and at least one buckling hole formed on the peripheral surface to be buckled with the corresponding buckle member on the cover of the keyboard, the keycap holder being fixed to the cover firmly by the buckle member buckling into the buckling hole;
a springy member, located on the second surface and disposed within the accommodation space; and
a keycap, connected movably to the springy member through the opening of the first surface of the keycap holder and capable of moving between a released position and a depressed position;
wherein the keycap is in the released position when not depressed and is in the depressed position pushing the springy member to be deformed downwardly when depressed.

7. The keyboard according to claim 6, wherein the keycap holder has a slot on a sidewall thereof, and the keycap has a hook which is engaged with the slot so as to be capable of moving between the released position and the depressed position.

8. The keyboard according to claim 6, wherein the keycap further comprises a support portion passing through the opening to be connected to the springy member and a pressing portion connected to the support portion and located outside of the keycap holder.

9. The keyboard according to claim 8, wherein the springy member further has a recess, and the keycap has a pillar disposed onto the support portion and inserted into the recess of the springy member.

10. The keyboard according to claim 6, wherein the keycap holder further has a detachment hole provided on a sidewall thereof and is used as a pivot point for pulling out the key module.

* * * * *